(12) United States Patent
Lude

(10) Patent No.: US 6,919,939 B2
(45) Date of Patent: Jul. 19, 2005

(54) FRONT UNIT OF AN ELECTRICAL DEVICE

(75) Inventor: Eric Lude, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 63 days.

(21) Appl. No.: 10/312,332

(22) PCT Filed: Jun. 7, 2001

(86) PCT No.: PCT/DE01/02186

§ 371 (c)(1),
(2), (4) Date: Jun. 3, 2003

(87) PCT Pub. No.: WO02/01283

PCT Pub. Date: Jan. 3, 2002

(65) Prior Publication Data

US 2003/0184689 A1 Oct. 2, 2003

(30) Foreign Application Priority Data

Jun. 27, 2000 (DE) .......................................... 100 31 251

(51) Int. Cl.⁷ ............................................. G02F 1/1333
(52) U.S. Cl. ............................. 349/58; 349/59; 349/60
(58) Field of Search ...................................... 349/58–60

(56) References Cited

U.S. PATENT DOCUMENTS

| 4,295,711 A | | 10/1981 | Tanaka et al. |
| 4,724,304 A | | 2/1988 | Teshima et al. |
| 5,508,834 A | * | 4/1996 | Yamada et al. ............... 349/58 |
| 6,020,867 A | * | 2/2000 | Shimada et al. ............... 345/87 |
| 6,060,985 A | | 5/2000 | Siviero |
| 6,108,066 A | * | 8/2000 | Yanagawa et al. .......... 349/141 |
| 6,147,724 A | * | 11/2000 | Yoshii et al. .................. 349/62 |
| 6,483,567 B1 | * | 11/2002 | Okada ........................ 349/158 |

FOREIGN PATENT DOCUMENTS

| BE | 0 524 430 A1 | 6/1992 |
| DE | 42 29 300 A1 | 1/1993 |

* cited by examiner

*Primary Examiner*—Huyen Ngo
(74) *Attorney, Agent, or Firm*—Morrison & Foerster LLP

(57) ABSTRACT

The invention provides a simple means of providing the front unit of an electrical device with a liquid crystal display element. A support film with strip conductors to electrical contact surfaces of the display element is configured specifically according to the device in terms of structure and the way in which the strip conductors are guided. The liquid crystal display element is mounted outside on a front panel, on a closed area and a cover film is pulled over at least this display element and the support film. The cover film is transparent at least in the area above the display element.

10 Claims, 2 Drawing Sheets

FRONT UNIT OF AN ELECTRICAL DEVICE

Figure 1:
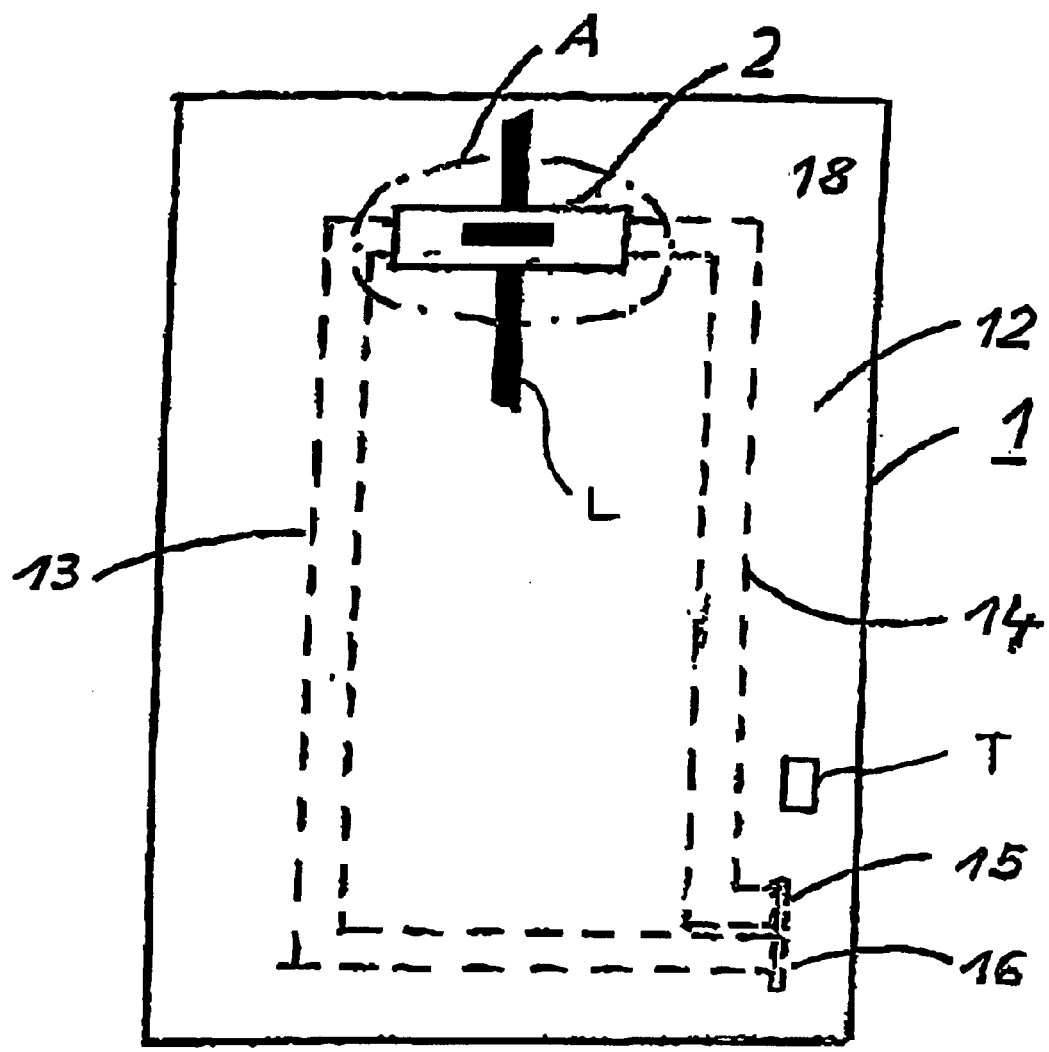

Liquid crystal display elements have long been known and are in widespread use. The liquid crystal display elements are provided with electrical contact surfaces, from which conductors lead to an electrical control device. With such liquid crystal display elements, various indications can be made visible by appropriate activation. In the case of electrical devices, liquid crystal display elements are often used for displaying measured values or counter readings, for example, and status indications. Since the display must be easily perceptible, the liquid crystal display elements are generally located on the front unit of the electrical devices.

To attach the liquid crystal display elements to the front unit of electrical devices, the front panel is provided with a recess, behind which or in which the respective liquid crystal display element is substantially arranged. This is accompanied by the advantage that the contact surfaces of the liquid crystal display device are accessible from the rear side of the front panel and can therefore be readily connected by conductors leading away from these contact surfaces in the interior of the electrical device to a control device. The recess in the front panel ensures that the liquid crystal display element is readable.

The invention is based on the object of providing the front unit of an electrical device with a liquid crystal display element in a comparatively simple way while improving the quality of the device.

The solution achieving this object according to the invention comprises a front unit of an electrical device with a liquid crystal display element with electrical contact surfaces and with a support film with strip conductors leading to the contact surfaces, the support film being configured specifically according to the device in terms of its structure and the way in which the strip conductors are routed, a front panel, on which the liquid crystal display element is mounted on the outside, on a closed area, and a cover film, which is pulled over at least the liquid crystal display element and the support film and is transparent at least in the area above the liquid crystal display element.

Although, while achieving a flat configuration, U.S. Pat. No. 4,295,711 discloses the use of a support film with strip conductors to allow external connection of the contact surfaces of a liquid crystal display element via strip conductors, this is a liquid crystal display device produced in a standard way with a prefabricated support film. The known liquid crystal display device is only suitable overall for mounting from the rear side of a front unit, because the strip conductors on the support film lie on top and therefore have to run unprotected within the electrical device behind the front panel. When the known liquid crystal display device is used on a front unit of an electrical device, a recess therefore has to be provided in the front panel to allow the liquid crystal display element to be read.

A major advantage of the front unit according to the invention is that the liquid crystal display element can be attached to it in a simple way, because it is mounted on the front panel in a closed area, so that a recess in the front panel is not required. The securing of the liquid crystal display element can in this case take place in various ways, for example by adhesive bonding or by the application of the cover film.

A further major advantage of the front unit according to the invention is that, by mounting the liquid crystal display element on the front side of the front panel, thereby dispensing with a recess in the front panel, sealing problems with regard to dust or moisture, for example, are avoided from the outset. Although in the case of the front unit according to the invention a through-opening is necessary on the support film for leading the strip conductor through into the interior of the electrical device, this through-opening need only be comparatively small.

In the case of an advantageous embodiment of the front unit according to the invention, the cover film has in the area of the liquid crystal display element a stamped formation, and the liquid crystal display element lies partly in the stamped formation and partly in a recess of the support film. With this embodiment, the obtrusion on the front panel caused by mounting the liquid crystal display element can be kept relatively small.

However, a cover film of an appropriate thickness with a cavity for receiving the liquid crystal display element may also be used.

In the case of the front unit according to the invention, the strip conductors on the support film may be connected in various ways to the contact surfaces on the liquid crystal display element; for example, the connection may take place by a hot-melting bonding material, such as for example that described in the aforementioned U.S. patent, which presupposes a suitable material for the support film.

However, it is regarded as particularly advantageous if the strip conductors are connected to the contact surfaces of the liquid crystal display element by a conductive paste. One advantage of this configuration of the front unit according to the invention is that the quality of the support film does not have to meet very high requirements, because, with a conductive paste, a reliable galvanic connection can already be established at low temperature. Suitable for this are, for example, silver solder pastes, which already harden at 70° C.

In the case of a particularly advantageous embodiment of the front unit according to the invention, the front panel is electrically shielding and has at a point which is uncritical in terms of EMC (Electromagnetic Compatibility) for the electrical device a lead-through opening for the strip conductors on the support film, and the strip conductors are arranged on the support film in such a way that they run from the contact surfaces through the lead-through opening. The particular advantage of this embodiment is that the EMC quality of the electrical device is not impaired by a recess for receiving the liquid crystal display element and no effect that is harmful to EMC enters the interior of the device through the through-opening for the strip conductor on the support film, because it is possible by appropriate configuration of the support film and the strip conductors on it to ensure that the through-opening is provided in a place on the front unit that is uncritical in terms of EMC.

It is known that the mode of operation of liquid crystal display elements is impaired at relatively low temperatures (below 0° C.), because a harmful crystallization process may then occur. It is therefore generally known—cf. for example U.S. Pat. No. 4,724,304—to provide a plate-shaped heating element underneath the liquid crystal display element.

According to a further configuration of the invention, heating can be ensured particularly well and easily by a heating foil being arranged underneath the support film and positioned with its area that has electrical heating elements underneath the liquid crystal display element.

Heating elements of various forms may be arranged in various ways on the heating foil. It is regarded as particularly advantageous if the heating elements comprise a conductive paste of a defined electrical resistance applied in a meandering form on the heating foil.

In order not to perform heating of the liquid crystal display device constantly, a temperature sensor is advantageously attached to the front panel, the output variable of which sensor is used for controlling the heating elements with respect to the intensity of the current flowing through.

In the case of a further advantageous configuration of the front unit according to the invention, on the cover film there is at least one line characterizing the path of a lead and, at at least one interruption point of this line, there is a liquid crystal display element as a position indicator.

Figure 2:
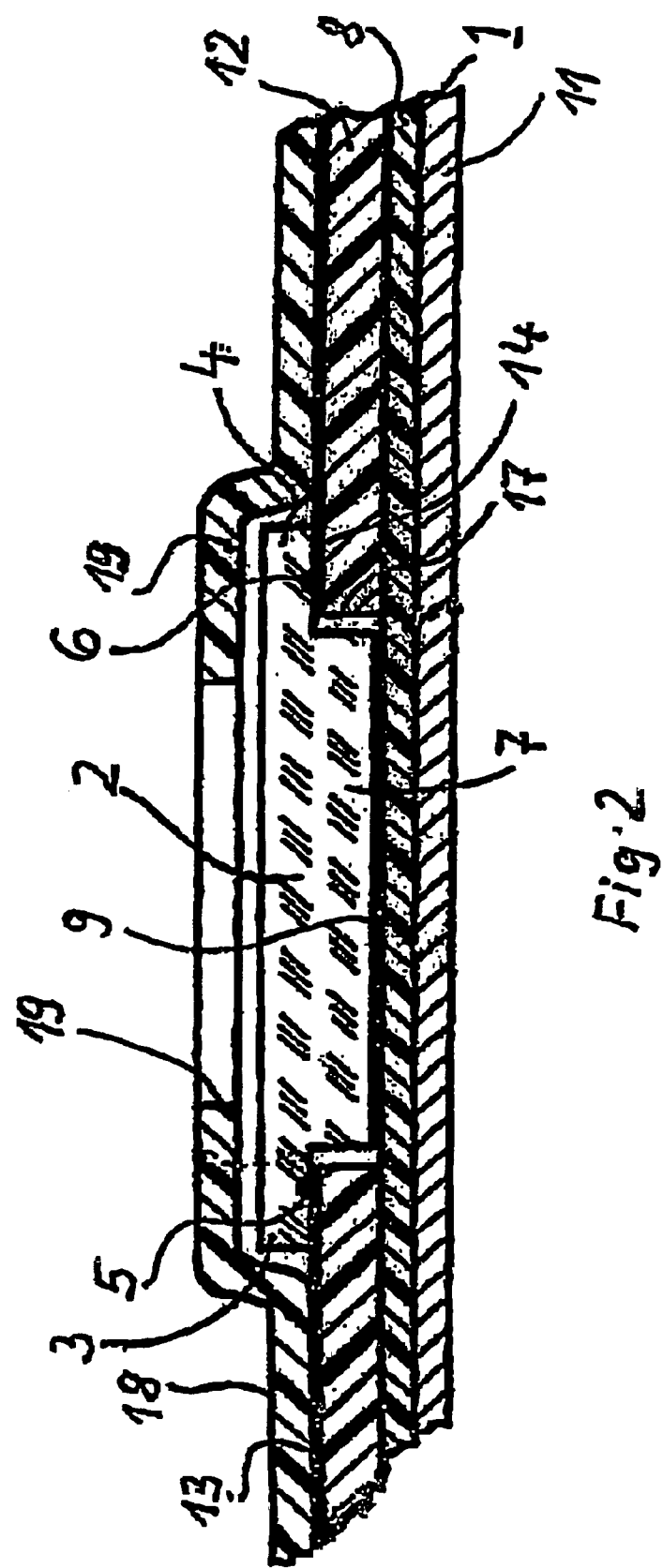

For further explanation of the invention, a (reduced) plan view of an exemplary embodiment of the front unit according to the invention is represented in FIG. 1 and a section through the region A according to FIG. 1 is represented in FIG. 2.

As the figures show, arranged on a front unit 1 is a liquid crystal display element 2, which has contact surfaces 5 and 6 under lateral projections 3 and 4. The liquid crystal display element 2 is connected by its lower region 7 in FIG. 2 to a heating foil 8, which has there heating elements 9 comprising a conductive paste of defined electrical resistance applied in a meandering form. Leading to this conductive paste are connecting leads, which are not represented in the figure for the sake of better overall clarity. The heating foil 8 is for its part securely fastened to a front panel 11 of the front unit 1 with an electrically shielding effect.

Above the heating foil 8 there is a support film 12, running on the upper side of which in FIG. 2 there are strip conductors 13 and 14, which lead to the contact surfaces 5 and 6; these strip conductors 13 and 14 preferably consist of conductive paste. As FIG. 1 shows, the strip conductors 13 and 14 are routed specifically according to the device on the support film 12, in that they are routed to a through-opening 15, through which the support film 12 with the strip conductors 13 and 14 is led into the interior of the electrical device, that is behind the front unit 1. If the EMC quality of an electrical device is important, the through-opening 15 is then placed on the front unit 1 in such a way that it lies at a point 16 which is uncritical in terms of EMC.

As FIG. 2 also reveals, the support film 12 is provided in the area of the liquid crystal display element 2 with a recess 17, into which the liquid crystal display element is fitted with its lower part 7.

A cover film 18 with a stamped formation 19 is pulled over the arrangement of the liquid crystal display element 2 and cover film 12 in such a way that it covers at least the liquid crystal display element 2 and the support film 12; FIG. 1 shows that the front unit 1 is covered over its entire surface area by the cover film 18. To ensure good readability of the liquid crystal display element 2, the cover film 18 is transparent, at least in the area of its stamped formation above the liquid crystal display element 2.

If the liquid crystal display element 2 is intended to form a position indicator for a switch, the cover film 18 bears at least one line L, for characterizing the path of a lead. This line L may, for example, run in a plane parallel to the plane of the drawing according to FIG. 1 on the cover film 18. If, for example, it is indicated with regard to the position of a switch in an electrical system that this switch is closed, it is ensured by an electronic control arrangement (not shown) that the liquid crystal display element 2 forms a bar which extends in the direction of the imperceptible line, whereby a closed switch is symbolized. When the switch is open, the liquid crystal display element 2 is activated in such a way that a bar with a direction perpendicular to the plane of the drawing is formed, as shown in the figure.

What is claimed is:

1. A front unit of an electrical device, comprising:

a liquid crystal display element with electrical contact surfaces and a support film with strip conductors leading to the contact surfaces, the support film being configured according to a structure of the device and based on routing of the strip conductors;

a front panel, on which the liquid crystal display element is mounted from the outside of the electrical device, on a closed area of the front panel; and a cover film, which is pulled over at least the liquid crystal display element and the support film and is transparent at least in the area above the liquid crystal display element.

2. The front unit as claimed in claim 1, wherein the cover film, in the area of the liquid crystal display element, has a stamped formation, and the liquid crystal display element lies partly in the stamped formation and partly in a recess of the support film.

3. The front unit as claimed in claim 2, wherein the strip conductors are connected to the contact surfaces of the liquid crystal display element by a conductive paste.

4. The front unit as claimed in claim 1, wherein the strip conductors are connected to the contact surfaces of the liquid crystal display element by a conductive paste.

5. The front unit as claimed in claim 1, wherein the front panel is electrically shielding and has, at a point which electromagnetic compatibility for the electrical device is not critical, a lead-through opening for the strip conductors on the support film, and the strip conductors are arranged on the support film such that they run from the contact surfaces through the lead-through opening.

6. The front unit as claimed in claim 1, further comprising a heating foil arranged underneath the support film and positioned such that electrical heating elements which are formed on the heating foil are positioned underneath the liquid crystal display element.

7. The front unit as claimed in claim 6, wherein the heating elements comprise a conductive paste of a defined electrical resistance applied in a meandering form on the heating foil.

8. The front unit as claimed in claim 7, further comprising a temperature sensor attached to the front panel.

9. The front unit as claimed in claim 6, further comprising a temperature sensor attached to the front panel.

10. The front unit as claimed in claim 1, wherein the cover film shows at least one line characterizing the path of a lead having at least one interruption point, where the liquid crystal display element is positioned showing a position indicator of the interruption point.

* * * * *